United States Patent [19]

Santen

[11] 4,077,528
[45] Mar. 7, 1978

[54] TREATMENT PLANT

[75] Inventor: Salomon Santen, Amsterdam, Netherlands

[73] Assignee: Stork Amsterdam B.V., Amstelveen, Netherlands

[21] Appl. No.: 713,500

[22] Filed: Aug. 11, 1976

[30] Foreign Application Priority Data

Aug. 15, 1975 Netherlands .......................... 7509786

[51] Int. Cl.² .............................................. A23L 3/06
[52] U.S. Cl. .................................... 214/18 R; 34/189; 99/360; 198/663
[58] Field of Search ........... 214/16.1 CE, 16 R, 17 R, 214/18 R, 21; 198/663; 34/147, 189, 192, 194; 99/348, 360

[56] References Cited

U.S. PATENT DOCUMENTS

| Re. 4,792 | 3/1872 | Smith | 34/189 |
| 1,852,633 | 4/1932 | Ziebarth | 214/16.1 CE |

Primary Examiner—Robert G. Sheridan
Attorney, Agent, or Firm—Ostrolenk, Faber, Gerb & Soffen

[57] ABSTRACT

A plant for physical or thermal treatment of products supported upon rectangular carriers, said plant comprising a vertical conveyor for moving the carriers upwards and downwards from in inlet station to an outlet station, the conveyor being constituted by four screw-threaded spindles, positioned near the four corners of the carriers. The helix of each spindle is a rod which is helically wound around a core. The pitch of the helix is, along an angular portion of this surface, zero at the level of the inlet and outlet station.

6 Claims, 8 Drawing Figures

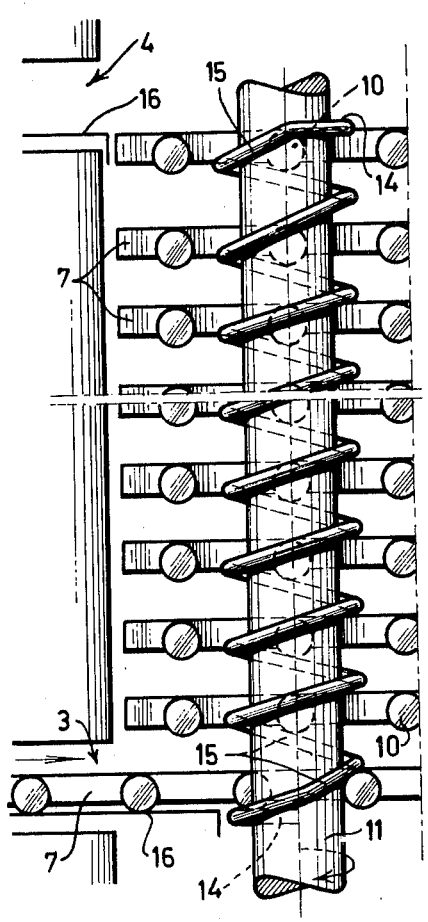
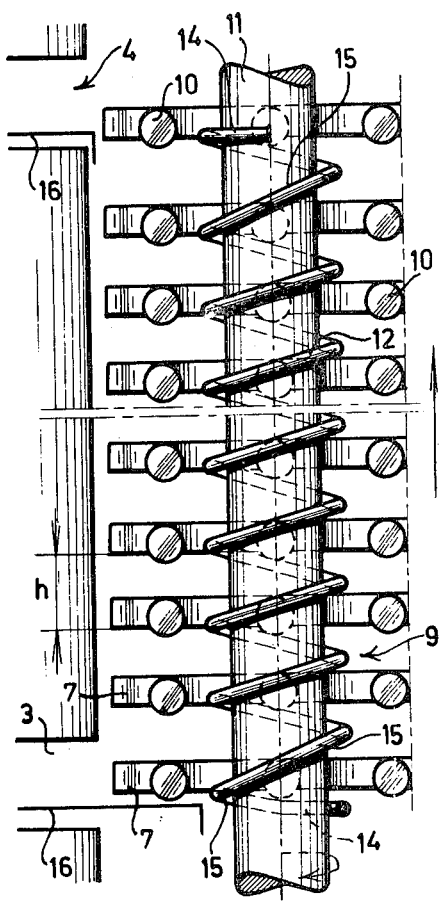
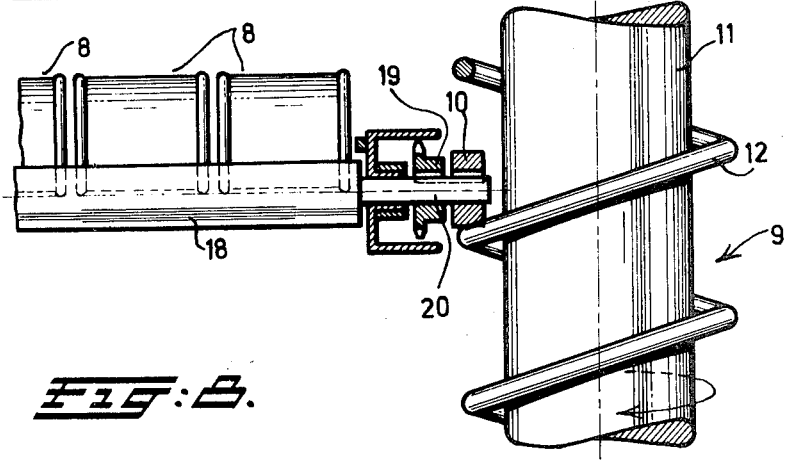
FIG: 3.  FIG: 4.  FIG: 5.

TREATMENT PLANT

BACKGROUND OF THE INVENTION

The present invention relates to a plant for physical and/or chemical treatment of products in a treatment space(chamber). The products are supported on carriers which are conveyed through the treatment space in a vertical direction; they enter said space through at least an inlet and are discharged from the space through at least one outlet station. The treatment space(chamber) includes driven conveying members for the vertical movement of the carriers. Such a plant is known per se in various versions. With respect hereto, reference is made to German Patent Specification 749,043 and to U.S. Pat. No. 3,864,846.

DISCUSSION OF THE PRIOR ART

With respect to Patent Application No. 681,257, filed Apr. 28, 1976 the invention aims to improve both the vertical and horizontal conveyance. In conformity to the present state of the art, the plant according to the invention can be used when an atmospheric pressure is applied or when a treatment is carried out at an increased or decreased pressure. For the latter treatment, a housing is required which encircles the relative plant.

In most prior art plants, the vertical transport is effected by chains cooperating with the carriers through protruding dogs; which particularly takes place when a vertical movement has to be carried out. A drawback of the said chain system is that only part of the chain is operative, whereas all other chain parts occupy a superfluous space. As a chain is always liable to play owing to wear, the connection to the inlet and outlet station gets imperfect, so that the position of the carriers is alternatively no longer horizontal.

SUMMARY OF THE INVENTION

The present invention aims to provide a conveying system which does not present the aforementioned drawbacks and which moreover, can offer further advantages. According to the invention, the conveying members constitute screw-threaded spindles each of which being able to cooperate with a part of the carriers within the treatment space.

These carriers will thus be supported by the helicoidal face of all the spindles. When the latter are simultaneously driven, a vertical movement of the carriers is produced; the carrier near the inlet station has to stop for some time in order to allow a horizontal movement through said station. If such a standstill period is realized, a periodical interruption in driving the screw spindles is one of the possibilities.

In a preferred embodiment of the plant, each spindle has a continuous drive, wherein the pitch of the helix is, along an angular portion of the helical face, zero at the level of the inlet and outlet station. This embodiment is important, as a considerable part of the inertia forces produced during a periodic interruption of the drive does not take place, so that the load and the capacity of the driving motor can be considerably reduced.

Although a conventional/screw spindle may be used, the present invention aims to provide a considerable simplification and improvement of the same. The helix of each screw spindle is namely constructed of a rod which is helically wound around a core. The pitch of the helix is along an angular portion of this surface level with the inlet and outlet station. Such a spindle can be manufactured more easily and is therefore less expensive. The pitch of the helix can be easily changed in order to produce a standstill period for a carrier being level with a passage opening (station), this in spite of the presence of the continuously driven spindles (or screw threaded rods).

The invention relates in particular to a plant provided with a housing, having at least in its upper and lower part an opening with rails for guiding the carriers. The carriers can have two parallel rows of supporting rollers. Each screw spindle cooperates with one of these supporting rollers during the vertical movement(conveyance) of the carrriers. The construction as described hereinbefore causes a considerable friction reduction in both the horizontal and vertical transport. Moreover, one or more pinions having teeth can be mounted flush with each passage opening; these teeth can cooperate with the supporting rollers of each carrier at that location, too.

SURVEY OF THE DRAWINGS

FIGS. 3 to 6 show on a larger scale four consecutive stages of vertical movement of the carriers within the housing of FIG. 1;

FIG. 8 shows a detail as a section according to line VIII—VIII in FIG. 1.

DESCRIPTION OF A PREFERRED EMBODIMENT

Figure 1:
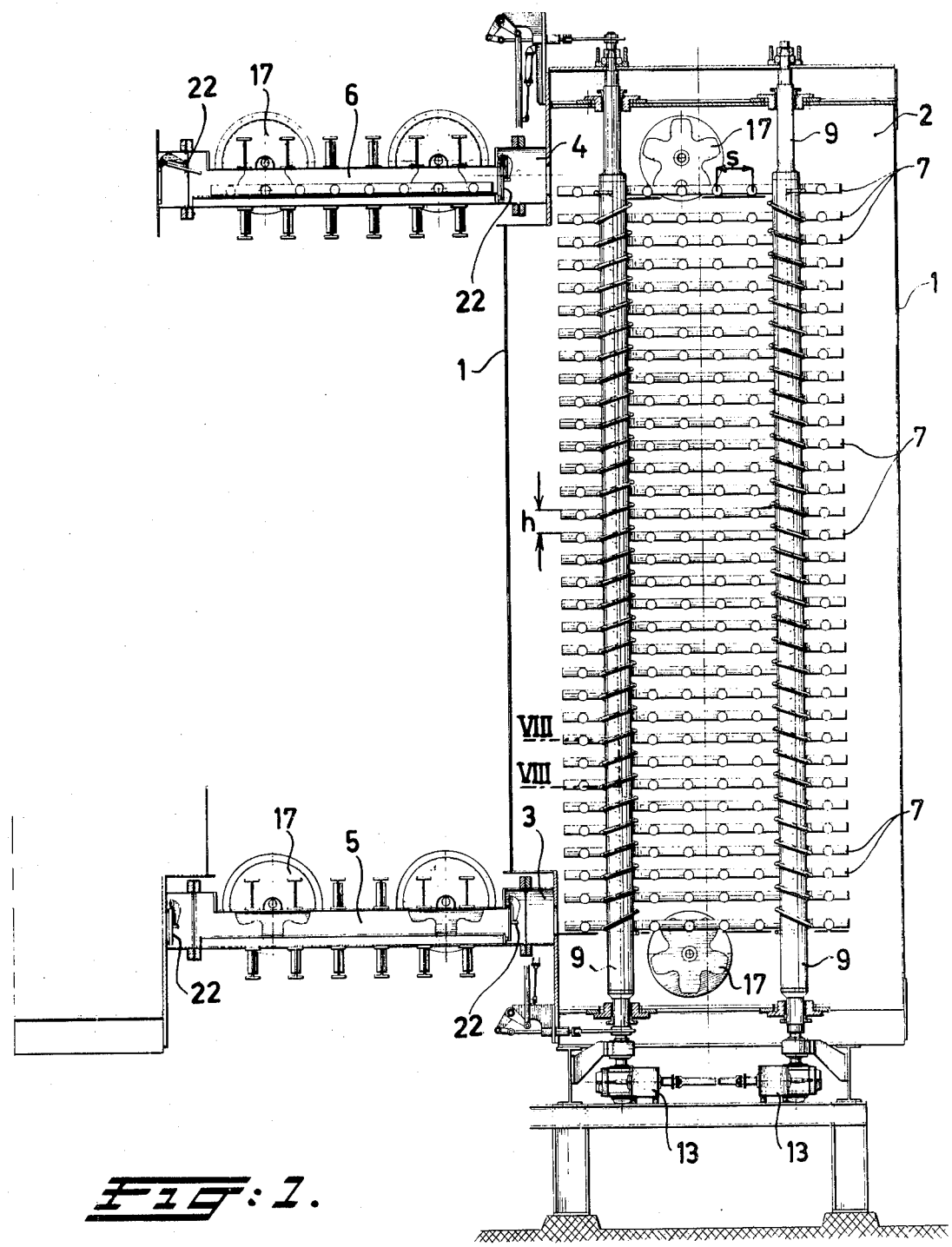
FIG. 1 is a vertical section through a housing having two passage openings or stations.

The plant as shown in FIG. 1 can be a part of a complete treatment system as described in the (Assignee's) aforementioned earlier Patent Application 681,257. Each apparatus can operate individually with its own feed- and discharge sluice. It is also possible to combine two or more plants, which then can have only one feed- and discharge sluice together. The plant comprises a housing 1 encircling a treatment space 2. The treatment itself can be a pasteurization or a sterilisation under an increased temperature and pressure. It is, however, also possible to effect a cooling, drying or impregnating treatment or the like. In the shown embodiment, a thermal treatment under overpressure is carried out, because the housing 1 constitutes seemingly an autoclave. The housing has two passage openings (stations) 3 and 4 adjoining a sluice 5, 6, respectively, this owing to the difference in pressure between the space 2 and the atmosphere. The presence of a housing is, however, not essential.

The plant further comprises a number of carrriers 7 for supporting the products to be treated. The carriers 7 can be executed as a plate or tray of a preferably rectangular shape, but in principle also differently shaped carriers, for instance a basket, can be used. The products to be treated, for instance cans 8, containing preserved food, are vertically supported in an upright position (see FIG. 2) or horizontally on a carrier (see FIG. 8). The plant according to the invention can, however, also be used for treatment of so-called pouches or even of bulk products. The housing 1 comprises conveying members 9, being vertical screw-threaded rods (screw spindles), each of which can cooperate with a part of the carriers 7 within the housing. In the aforementioned embodiment, the carriers 7 have a rectangular shape and four screw spindles are pairwise arranged on either side of the carriers, as is best seen from FIG. 2.

Figure 7:
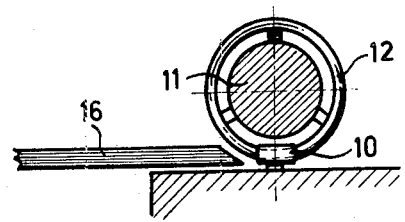
FIG. 7 shows on a larger scale a detail VII of FIG. 2.

The carriers 7 have two parallel rows of supporting rollers 10 one of which always cooperates with a screw spindle 9 during a vertical movement (transport) within the treatment space 2. The helix of each screw spindle is a rod 12 extending substantially helically around a core 11. Between the core 11 and the rod 12 is a slight spacing (see FIG. 7). Connecting blocks are mounted between the outer circumference of the core 11 and the inside of rod 12, giving the rollers 10 sufficient space for moving upwards or downwards along the rod 12.

The rod 12 which extends helically around the core 11 may be executed in various ways. This depends upon the drive 13 of the spindles 9, which drive can be continuous or stepwise. In the latter case, the pitch of the rod 12 is constant, as then sufficient time is available for the discharge or introduction of a carrier through the stations 3 and 4, during the standstill periods or the screw spindles (or screw-threaded rods) The embodiment of the plant as shown in the drawing has a continuous drive. The shape of the rod 12 is adapted for allowing a horizontal transport of the carriers into or from the housing 1. For that purpose, the pitch of the helix of the rod 12 which is flush with each passage opening (station), equals 0° over a part of its circumference. This means that at that location a horizontal helicoidal face is present, enabling a lateral movement of the respective carrier 7. The horizontal part 14 of the helix of the rod 12 of each screw spindle 9, has an arcuate angle of some 90°, from which results that there is a lapse of time of a quarter revolution of the spindles 9 for supplying and discharging a carrier 7 in a horizontal direction. In order to maintain the the maintain the desired mutual spacing of the carriers which are conveyed in a vertical direction, the pitch of the adjacent part 15 of each rod 12, has over an arcuate angle of 270° in the direction of transport a greater value corresponding to a complete revolution with the average pitch.

FIG. 1 shows this construction of the screw spindles or screw threaded rods 9.

FIGS. 3 – 6 show the progress of the horizontal and vertical movements within the space 2 during a complete cycle.

FIG. 3 shows the moment at which a carrier 7 just enters the space 2 via the inlet station 3, while the supporting rollers bear on the horizontal part 14 of the rods 12 of the screw spindles 9.

FIG. 4 shows the situation after a rotation of the spindles 9 through 90°. All carriers 7 in the space 2 have been moved upwards over a quarter distance $h$ except the lowermost and uppermost carrier. The lowermost carrier has initially fallen behind due to the horizontal part 14 of the rod 12. In FIG. 4 is depicted that this lag has already partially been overtaken because the respective roller 10 moves along the strongly inclined part 15 of the rod 12. The uppermost carrier 7 has likewise been moved upwards at an increased spreed, due to the cooperation between the roller 10 and the part 15. Pressure is exerted on the exit sluice 6 in order to prepare this carrier for the planned discharge.

Figure 5:
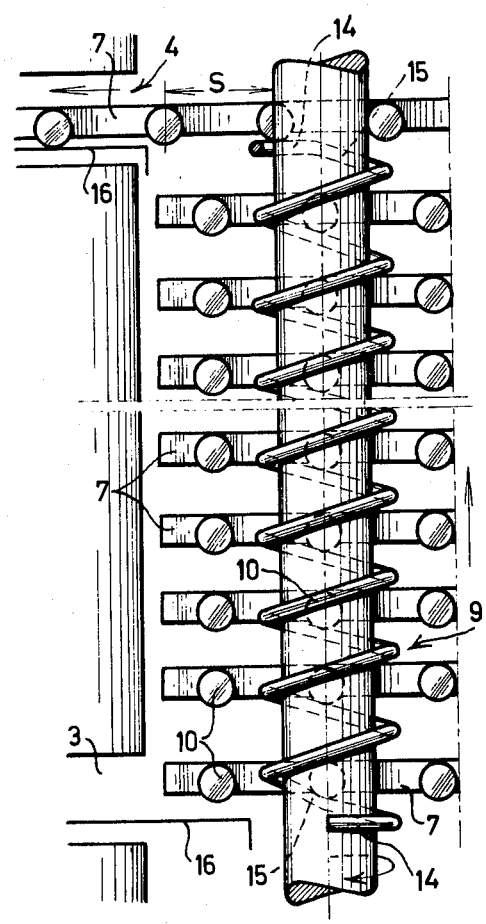

FIG. 5 shows that the screw spindles have been rotated once more through 90°. The upper part of the spindles is now in the correct position for discharging the uppermost carrier 7 through the sluice 6, as the relative rollers bear on the flat part 14.

Figure 6:
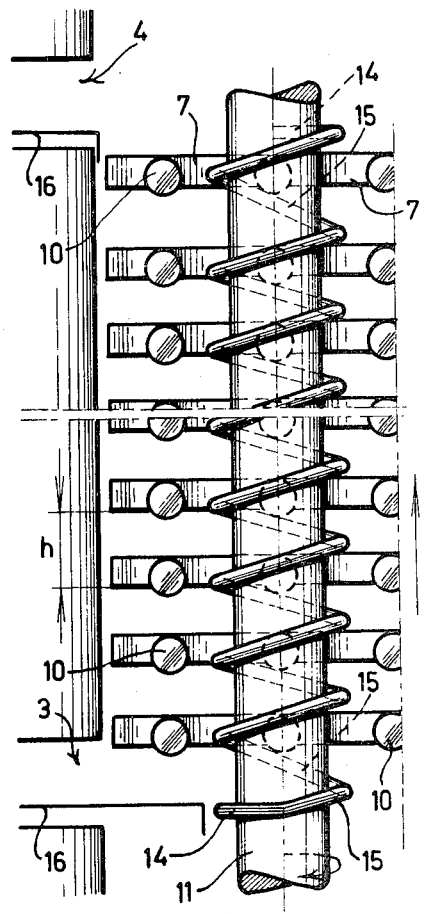

FIG. 6 shows a further rotation of the spindles through 90°. Pressure is exerted on the lower sluice 5, so that another carrier can enter the inlet station 3 at the lower end.

After another rotation of the screw spindles 9, the situation as depicted in FIG. 3 arises again, where a fresh carrier 7 can be moved forward.

In order to realize the aforementioned horizontal conveyance of the carriers 7 through the passage openings, stations resp., 3 and 4, one or more pinions 17 are mounted inside and outside the housing 1, level with each passage opening, station resp. The pinions have teeth which cooperate with the supporting rollers 10 of each carrier 7 at that location. The axis of the pinion is horizontal contrary to their vertical position in the construction as described in the (Assignee's) prior Patent Application No. 681,257. The pinions 17 are mounted over the rollers 10, except for the pinion within the housing, which is mounted in the lower part of the treatment chamber 2 near the inlet station 3.

FIG. 8 shows an embodiment in which each carrier 7 has a bottom constituting a plurality of parallel rods 18. These rods are freely rotatable in the carrier 7 and at least one of them is coupled to a supporting roller 10, which cooperates with the spindles 9. When the screw spindles 9 are rotated, the supporting rollers 10 will likewise rotate and thus a rotation of the rods 18, followed by a slight rotation of the cylindrical cans 8 bearing on the rods 18. This can have a favorable effect when the plant is used for products like milk, rice pudding, some soups and baby food. For driving all rods 18, a chain wheel 19 is attached to the shaft 20 of each rod 18. A chain (not shown) will drive the other rods 18 of the carriers 7 turn by turn, for the rotation of the cans 8 bearing thereon.

Some vertical stationary guiding ledges are mounted within the housing 1. Each carrier 7 cooperates with these ledges during the vertical transport of the carriers.

Figure 2:
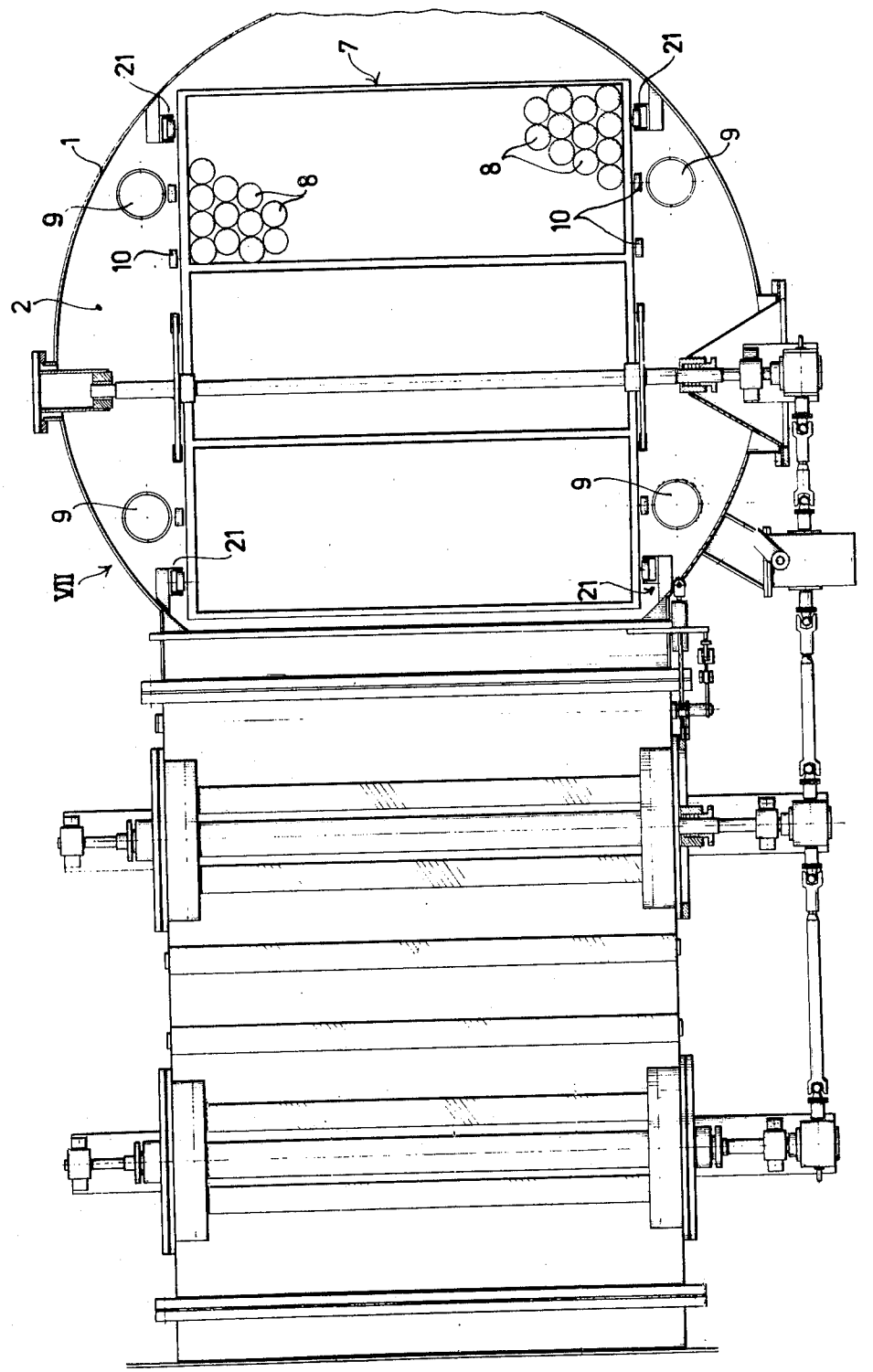
FIG. 2 is a plan view of FIG. 1, the cover of which has been removed.

The ledges are best seen from FIG. 2, and are in this case, U-shaped within which a roller 10 is guided. In the area within the housing 1, diametrical to the inlet station 3, one of the ledges extends further downwards than the other ones, in order to serve as an abutment when a carrier 7 enters.

All changes of the carriers both in a horizontal and a vertical direction, are performed at a continuous rate of intermittent movements permitting the doors 22 of the sluices 5, 6 to be opened and closed and the carriers to be supplied and discharged at the proper time. The sluices can operate alternately (as clarified above) or simultaneously. This has already been described in the said prior Patent Application wherein, however, the applied conveying system (chains) required a stepwise drive.

In the present invention, the screw spindles 9 can now be continuously driven; the required off positions are attained owing to parts 14 and 15 of the rods 12. The distance between the pinions 17 is a multiple of the pitch $s$ (see FIG. 1) of the rollers 10 and the teeth of the pinions, so that the carriers 7 can be easily taken over from one pinion to the other.

The present plant cannot only be used in a system having a number of parts like described in the aforementioned Prior Patent Application, but also as a single treatment plant.

As described in the foregoing, a quasi-continuous flow of carriers 7 can be effected. It is, however, possible, too, to use the plant solely as an autoclave. In that case, the treatment chamber(space) 2 is first entirely filled with carriers 7 which have entered through the inlet station 3. The product to be treated is placed upon the carriers, whereafter a thermal and physical treatment is initiated and completed. Finally all carriers are discharged from space 2 through the outlet station 4.

The capacity of the treatment space 2 can be utilized optimally as regards the dimensions of the cans (containers) 8 or of the carriers 7. The pitch of the screw spindles (or threaded rods) 9 can be easily adapted to the minimally permissable distance $h$ between two consecutive carriers. For manufacturing the desired screw spindles, the rod 12 is bent into a helix with the desired pitch.

What is claimed is:

1. An apparatus for physical and/or chemical treatment of products in a treatment space, said products being supported on carriers which are conveyed through the treatment space in a vertical direction, the products being introduced through at least one passage opening into the space and discharged from this space through another opening, the plant comprising driven conveying members within the treatment space for the vertical movement of the carriers, wherein these conveying members are vertically positioned screw spindles (or screwthreaded rods), each of which is capable to cooperate with a part of all carriers within the treatment space a housing for said space which is at least in its upper and lower part provided with a passage opening with rails for guiding the carriers, which have two parallel rows of supporting rollers, each screw spindle always cooperating with one of the supporting rollers of each carrier during its vertical movement (transport), each carrier having a bottom constituted by a plurality of parallel rods, the rods being freely rotatable in the respective carrier and at least one of them being coupled to a supporting roller which cooperates with a screw spindle.

2. An apparatus according to claim 1, wherein each screw spindle is continuously driven, the angle of pitch of the portion of the helicoidal face which is flush with each passage opening, being equal to $0°$ (horizontal helicoidal face).

3. An apparatus according to claim 2, wherein the horizontal helicoidal portion of the bar of each screw spindle has an arcuate angle of some 90° while the pitch of the adjacent portion in the direction of conveyance through an angle of 270°, has a greater value corresponding to a complete revolution with the average pitch.

4. An apparatus according to claim 2, wherein each screw spindle is constructed of a core with a rod extending substantially helically around this core having a flat portion which is level with each passage opening(station).

5. An apparatus according to claim 1, wherein inside and outside the housing and flush with each passage opening, at least one pinion is mounted with teeth which can cooperate with the supporting roller of each carrier at that location.

6. An apparatus according to claim 1, wherein at least two vertical stationary guiding ledges are mounted within the housing, each carrier cooperating with these ledges during its vertical transport.

* * * * *

UNITED STATES PATENT AND TRADEMARK OFFICE
CERTIFICATE OF CORRECTION

PATENT NO. : 4,077,528
DATED : MARCH 7, 1978
INVENTOR(S) : Salomon Santen

It is certified that error appears in the above-identified patent and that said Letters Patent are hereby corrected as shown below:

Column 1, line 13, "movenent" should read -- movement --.

line 62, "conventional/screw" should read --

-- conventional screw --.

Column 3, line 20, after "rods)", insert -- . --.

line 34, delete "the maintain the".

line 58, "spreed" should read -- speed --.

Signed and Sealed this

Tenth Day of July 1979

[SEAL]

Attest:

Attesting Officer

LUTRELLE F. PARKER
Acting Commissioner of Patents and Trademarks